(12) United States Patent
Lin et al.

(10) Patent No.: US 10,996,487 B2
(45) Date of Patent: May 4, 2021

(54) COMBINED GLASSES STRUCTURE, FRAMELESS GLASSES, HALF-FRAME GLASSES AND FULL-FRAME GLASSES

(71) Applicant: XIAMEN YARUI OPTICAL CO., LTD., Fujian (CN)

(72) Inventors: Zheyu Lin, Fujian (CN); Qunyan Shangguan, Fujian (CN)

(73) Assignee: XIAMEN YARUI OPTICAL CO., LTD., Fujian (CN)

( * ) Notice: Subject to any disclaimer, the term of this patent is extended or adjusted under 35 U.S.C. 154(b) by 79 days.

(21) Appl. No.: 16/068,907

(22) PCT Filed: Sep. 29, 2016

(86) PCT No.: PCT/CN2016/100854
§ 371 (c)(1),
(2) Date: Jul. 10, 2018

(87) PCT Pub. No.: WO2017/197824
PCT Pub. Date: Nov. 23, 2017

(65) Prior Publication Data
US 2019/0219837 A1    Jul. 18, 2019

(30) Foreign Application Priority Data

May 18, 2016   (CN) .......................... 201610329468.4

(51) Int. Cl.
*G02C 1/08* (2006.01)
*G02C 5/14* (2006.01)
(Continued)

(52) U.S. Cl.
CPC ................. *G02C 1/08* (2013.01); *G02C 1/02* (2013.01); *G02C 1/04* (2013.01); *G02C 1/06* (2013.01);
(Continued)

(58) Field of Classification Search
CPC ... G02C 1/08; G02C 1/02; G02C 1/04; G02C 1/06; G02C 5/00; G02C 5/02; G02C 5/10;
(Continued)

(56) References Cited

U.S. PATENT DOCUMENTS 4,798,455 A * 1/1989 Yoe .......................... G02C 5/02
351/158
5,098,180 A    3/1992 Tobey
(Continued)

FOREIGN PATENT DOCUMENTS

CN         2337578 Y      9/1999
CN       102692728 A      9/2012
(Continued)

OTHER PUBLICATIONS

International Search Report for PCT/CN2016/100854.

*Primary Examiner* — George G King
(74) *Attorney, Agent, or Firm* — Schmeiser, Olsen & Watts, LLP

(57) ABSTRACT

A combined glasses structure, including a lens component, two temples, a frame component and a nose pad component is provided. The lens component comprises two lens and a bridge, two temples are respectively detachably connected to the lens component; the frame component includes an upper frame and a lower frame, the upper frame and lower frame are respectively detachably arranged on an upper and a lower edge of the lens component; the nose pad component and the bridge are detachably connected to each other, and can restrict and fix the upper frame and/or lower frame arranged on the upper edge, lower edge, upper and lower edges of the two lens. By the detachable connection between the frame component and the lens, the frameless, half-frame (Continued)

(upper frame or lower frame) and full-frame functions of the combined glasses can be achieved.

5 Claims, 15 Drawing Sheets

(51) Int. Cl.
    *G02C 5/12*        (2006.01)
    *G02C 1/02*        (2006.01)
    *G02C 1/04*        (2006.01)
    *G02C 1/06*        (2006.01)
    *G02C 5/22*        (2006.01)
    *G02C 5/00*        (2006.01)
    *G02C 5/02*        (2006.01)
    *G02C 5/10*        (2006.01)
    *G02C 11/02*      (2006.01)

(52) U.S. Cl.
    CPC ................ *G02C 5/00* (2013.01); *G02C 5/02* (2013.01); *G02C 5/10* (2013.01); *G02C 5/12* (2013.01); *G02C 5/126* (2013.01); *G02C 5/14* (2013.01); *G02C 5/22* (2013.01); *G02C 5/122* (2013.01); *G02C 11/02* (2013.01); *G02C 2200/04* (2013.01); *G02C 2200/08* (2013.01); *G02C 2200/26* (2013.01)

(58) Field of Classification Search
    CPC . G02C 5/12; G02C 5/126; G02C 5/14; G02C 5/22; G02C 5/122; G02C 11/02; G02C 2200/04; G02C 2200/08; G02C 2200/26
    USPC .................................................. 351/137–138
    See application file for complete search history.

(56) References Cited

U.S. PATENT DOCUMENTS

| | | | | |
|---|---|---|---|---|
| 5,406,337 | A * | 4/1995 | Metcalfe | G02C 1/02 351/108 |
| 2007/0273823 | A1* | 11/2007 | Lee | G02C 11/02 351/52 |
| 2015/0103304 | A1* | 4/2015 | Darcy | G02C 1/06 351/52 |
| 2015/0168745 | A1* | 6/2015 | Weinberg | G02C 5/02 351/52 |
| 2017/0322427 | A1* | 11/2017 | Chen | G02C 5/12 |

FOREIGN PATENT DOCUMENTS

| | | |
|---|---|---|
| CN | 203069888 U | 7/2013 |
| CN | 203732816 U | 7/2014 |
| CN | 203773179 U | 8/2014 |
| CN | 204203562 U | 3/2015 |
| CN | 105759451 A | 7/2016 |
| JP | H0199019 A | 4/1989 |

\* cited by examiner

US 10,996,487 B2

COMBINED GLASSES STRUCTURE, FRAMELESS GLASSES, HALF-FRAME GLASSES AND FULL-FRAME GLASSES

CROSS-REFERENCE TO RELATED APPLICATIONS

This application claims priority to PCT Application No. PCT/CN2016/100854, having a filing date of Sep. 29, 2016, based off of Chinese Application No. 201610329468.4 having a filing date of May 18, 2016, the entire contents both of which are hereby incorporated by reference.

FIELD OF TECHNOLOGY

The following relates to the technical field of glasses, especially a composite glasses structure of rimless glasses, semi-rimless glasses and full-rim glasses.

BACKGROUND

In the existing technology, the glasses are divided into rimless glasses, semi-rimless glasses and full-rim glasses. In general case, different sports need to wear different glasses, e.g. when playing golf, rimless glasses are usually used to avoid sight line blocking and ensure light sport; when riding, semi-rimless (upper rim) glasses are usually used to ensure that sweat on the lenses is able to flow down.

The Chinese patent document CN203732816U disclosed a lens quick-release snap-fitting glasses structure in Jul. 23, 2014. It realizes the detachable connection of the upper rims and the lens assembly in the technical scheme of the patent, but not includes the rimless, lower rim and full-rim functions.

In the existing technology, the rimless, half-rimless or full-rim functions cannot be gathered in one pair of glasses at the same time, so that when carrying out different sports, different glasses are used, which increases the cost and decreases the convenience to carry and use.

In the existing technology, glasses typically consist of earpieces and lens assembly. The earpieces are pivotally coupled to the lens assemblies, and be capable of being folded and opened.

In the existing technology, the glasses body and lens assembly are typically assembled and non-removable, and the lenses in the lens assembly are also non-removable so as not to facilitate the cleaning and replacement of the lenses.

The Chinese patent document CN204203562U disclosed a kind of connecting glasses structure of rims and lenses on Mar. 11, 2015. The connecting glasses structure provided in the technical scheme of the patent uses the rotating block to achieve the removable lenses, but there still are some deficiencies, namely, it cannot adjust the earpieces outreach range.

Since the size of the wearer's head is different, and the distance between the two earpieces in the existing technology can generally not be adjusted, so that the glasses do not apply to different wearers and the comfort of the wearers also be affected.

SUMMARY

An aspect relates to a detachable composite glasses structure.

In order to solve the technical problem described above, the following technical scheme is adopted.

The composite glasses structure comprises a lens assembly, two earpieces, a rim assembly and a nose pad assembly. Wherein, the lens assembly comprises two lenses and a cross beam for connecting the two lenses; the two earpieces are respectively detachably connected with the lens assembly; the rim assembly comprises an upper rim and a lower rim which are respectively detachably connected with the upper and lower edges of the lens assembly; and the nose pad assembly is arranged on the inner side of the cross beam and is detachably connected with the cross beam, and it also can limit and fix the upper edge, lower edge, and upper rim and/or lower rim of the two lenses.

The two earpieces are respectively connected to the lens assembly. The nose pad assembly is connected to the inner side of the cross beam in the lens assembly. So the two earpieces, lens assembly and nose pad assembly can be combined to form the first state of glasses structure.

The two earpieces are respectively connected to the lens assembly. The upper rim in the rim assembly is arranged on the upper edge of the two lenses in the lens assembly. The nose pad assembly is connected to the inner side of the cross beam in the lens assembly, and it can limit and fix the upper rim arranged on the upper edge of the two lenses. So the two earpieces, lens assembly, nose pad assembly and upper rim of the rim assembly can be combined to form the second state of glasses structure; The two earpieces are respectively connected to the lens assembly. The lower rim in the rim assembly is arranged on the lower edge of the two lenses in the lens assembly. The nose pad assembly is connected to the inner side of the cross beam in the lens assembly, and it can limit and fix the lower rim arranged on the lower edge of the two lenses. So the two earpieces, lens assembly, nose pad assembly and lower rim of the rim assembly can be combined to form the third state of glasses structure; The two earpieces are respectively connected to the lens assembly. The upper and lower rims in the rim assembly are respectively arranged on the upper and lower edges of the two lenses in the lens assembly. The nose pad assembly is connected to the inner side of the cross beam in the lens assembly, and it can limit and fix the upper and lower rims arranged on the upper and lower edges of the two lenses. So the two earpieces, lens assembly, nose pad assembly and upper and lower rims of the rim assembly can be combined to form the fourth state of glasses structure.

Further, the inner side of the cross beam in the lens assembly is provided with a mounting part. The nose pad assembly comprises a rotating assembly which is detachably connected with the mounting part. The rotating assembly can turn relative to the mounting part, and is provided with a first limiting part. The upper rim in the rim assembly is provided with a first fitting part which can cooperate with the first limiting part;

When the rotating assembly in the nose pad assembly is rotated to a first position which can fit with the nose beam of the human body, the first limiting part of the rotating assembly can be rotated to the position which is counterbalanced by the first fitting part of the upper rim to limit and fix the upper rim;

When the rotating assembly in the nose pad assembly is rotated from the first position to the second position along the direction away from the cross beam, the first limiting part of the rotating assembly can be separated from the first fitting part of the upper rim to free the upper rim.

Further, the rotating assembly comprises nose pads, rotating shafts and connecting pieces for connecting nose pads and rotating shafts. The nose pads are fixed on the connecting pieces. The connecting pieces are connected with the rotating shafts and can drive the rotating shafts to turn. The rotating shafts are detachably positioned on the mounting parts on the inner side of the cross beam;

A first limiting block is arranged on the rotating shaft as a first limiting part of the rotating assembly, and a first limiting groove is arranged on the upper rim in the rim assembly as a first fitting part of the upper rim. When the rotating assembly is rotated to the first position, the first limiting block is counterbalanced by the first limiting groove to limit and fix the upper rim, and when the rotating assembly is rotated to the second position, the first limiting block is separated from the first limiting groove to free the upper rim.

Further, the first limiting block is provided with a abdicating groove surface and a convex part. The former is formed through the inward concaving of the rotating shaft, and the latter is formed through the extension of the first limiting block to the outer side of the abdicating groove surface. The lower end of the first limiting groove on the upper rim is provided with a limiting hook which can extend at a certain distance to the inner side of the upper rim;

When the rotating assembly is rotated to the first position, the limiting hook can abut against the convex part of the first limiting block, and when the rotating assembly is rotated to the second position, the abdicating groove surface can be rotated to the side close to the limiting hook, and interference is not generated on the limiting hook when the upper rim is removed.

Further, the rotating assembly further comprises a second limiting part, and the lower rim in the rim assembly is provided with a second fitting part matched with the second limiting part;

When the rotating assembly in the nose pad assembly is rotated to a first position which can fit with the nose beam of the human body, the first limiting part of the rotating assembly can be rotated to the position which is counterbalanced by the first fitting part of the upper rim to limit and fix the upper rim;

When the rotating assembly in the nose pad assembly is rotated from the first position to the second position along the direction away from the cross beam, the first limiting part of the rotating assembly can be separated from the first fitting part of the upper rim to free the upper rim.

Further, a second limiting groove is arranged on the connecting piece in the rotating assembly as a second limiting part of the rotating assembly, and a second limiting block is arranged on the lower rim as a second fitting part of the lower rim;

When the rotating assembly is rotated to the first position, the second limiting block is abutted and matched with the second fitting part to limit and fix the lower rim, and when the rotating assembly is rotated to the third position, the second limiting block is separated from the second fitting part to free the lower rim.

Further, the second limiting groove is a columnar groove, and the second limiting block is a columnar bump, and the columnar groove can be sleeved on the columnar bump.

Further, the nose pad assembly further comprises a connecting piece which is pivotally connected with a rotating shaft in the rotating assembly. The inner side of the cross beam is provided with a first mounting hole as a first mounting part of the cross beam, and the connecting piece in the nose pad assembly can be detachably inserted and connected with the first mounting hole to position the rotating shaft.

Further, the connecting piece is provided with a first end and a second end. The first end can be inserted into the first mounting hole arranged on the inner side of the cross beam, and the second end is provided with two grooves. The rotating shaft can match with the two grooves and can turn relative to the grooves. The two grooves are respectively positioned on two sides of the first limiting block on the rotating shaft.

Further, the lens assembly further comprises lens inner rim with two glasses rings into which the two lenses in the lens assembly can be arranged respectively. The lens inner rim between the two glasses rings forms the cross beam; or the lens assembly is an integral lens, and the cross beam of the integral lens is formed between two lens zones.

Further, the two earpieces are respectively detachably connected with the lens assembly through the earpieces articulating mechanism, one end of which is used for pivoting the earpiece, and the other end is used for disassembling and connecting the lens assembly.

Further, the earpieces articulating mechanism comprises a first body and a second body. Wherein, the first body is used for disassembling and connecting the lens assembly in snap-in type. It is provided with a pivot interface in which the first pivot shaft is arranged. The second body is provided with a first end and a second end. Wherein the first end is pivotally connected to the first pivot shaft in the pivot interface and can abut and match with the inner wall of the first body pivot interface, and the second end is pivotally connected with the pivot end of the earpiece. The side opposite to the second body is provided with a buckle piece which is provided with a first end and a second end. A pivot point is arranged between the first end and the second end and is also pivotally connected with the first pivot shaft in the pivot interface. A compression spring is arranged between the first end of the buckle piece and the second body, and two ends of the compression spring are limited between the first end of the buckle piece and the second body. The second end of the buckle piece is provided with a fixing part for buckling the lens assembly;

Depending on the elastic force of the first end of the compression spring on the first end of the buckle piece, the second end of the buckle piece can be abutted against the first body, so that the lens assembly can be fixed under the cooperation of the fixing part of the second end of the buckle piece with the first body;

Depending on the elastic force of the second end of the compression spring on the second body, the first end of the second body can be abutted against the first body;

When the first end of the buckle piece is pressed to compress the compression spring, the second end of the buckle piece can turn at a certain range, and the fixing part of the second end of the buckle piece can be matched with the first body to free the lens assembly, so that the lens assembly can be disassembled;

After the earpieces are fully opened, the pivot end of the earpieces can abut and match with the second end of the second body, so that the earpieces can drive the second body to outward turn a certain range around the first pivot shaft from the fully open position, and the compression spring can be further compressed by the second body.

Further, the end part of the first body in the articulating mechanism is convexly provided with a fourth limiting block as the fourth limiting part of the earpieces articulating mechanism. The two ends of the upper rim are respectively provided with a fourth limiting groove as a fourth fitting part of the upper rim. The fourth limiting part of the articulating mechanism can be matched with the fourth fitting part at the two ends of the upper rim to limit and fix the upper rim.

Further, the edge of the lens assembly is convexly provided with a connecting part, and the edge of the lens assembly under the connecting part is provided with a third limiting groove. The two ends of the lower rim are respectively provided with a third limiting block which can be assembled to the position close to the inner wall of the third limiting groove. The edge of the first body is provided with an accommodating groove matched with the connecting part. A limiting bump is convexly formed on the inner wall of the accommodating groove and can be assembled into the third limiting groove and abut against the outer side of the third limiting block.

Further, the earpiece pivot end is provided with a limiting notch, in which a second pivot shaft is arranged. The second end of the second body is pivotally connected to the second pivot shaft. After the earpiece is fully opened, the second end of the second body can be abutted against the inner wall of the limiting notch at the earpiece pivot end.

Further, the edge of the lens assembly is convexly provided with a connecting part, on which a groove hole is arranged. The edge of the first body is provided with an accommodating groove matched with the connecting part and an abutting surface abutted and matched with the fixing part of at the second end of the buckle piece. The second end of the buckle piece is provided with a buckle stand as the fixing part. The buckle stand can be inserted into the groove hole on the connecting part and abutted against the abutting surface to fix the lens assembly.

Further, the accommodating groove on the side wall of one side of the buckle piece is provided with a via hole which extends to the outer side of the first body and is connected with the pivot interface of the first body. The buckle stand can be matched with the groove hole through the via hole.

The embodiment also provides a kind of rimless glasses with the composite structure indicated in any one of the above technical schemes. The rimless glasses are combined in the first state of the glasses structure above.

The embodiment also provides a kind of semi-rimless glasses with the composite structure indicated in any one of the above technical schemes. The semi-rimless glasses are combined in the third state of the glasses structure above.

The embodiment also provides a kind of full-rim glasses with the composite structure indicated in any one of the above technical schemes. The full-rim glasses are combined in the fourth state of the glasses structure above.

Through the detachable connection of the rim assembly and lenses, embodiments of the invention can realize the rimless, semi-rimless (upper rim or lower rim) and full-rim functions of the composite glasses. When carrying out different sports, it only needs to disassemble and assemble the upper and lower rims of the rim assembly. Therefore, the consumer can use the rimless, semi-rimless and full-rim functions only through one pair of glasses, which decreases the cost and increases the convenience to carry and use for the simple structure, convenient assembling and disassembling.

The first and second ends of the compression spring are respectively abutted against the buckle piece and the second body. It can realize the fixing and disassembling of the lens assembly under the cooperation of buckle piece and first end of the compression spring; And it can realize the adjustment of opening range of the earpiece under the cooperation of the second body and second end of the compression spring, so as to meet the requirements of different wearers. By utilizing the scalability of the compression spring, embodiments of the invention can realize the bidirectional utilization of two ends of the compression spring, including the detachable function of the lens assembly and the adjustment of the opening range of the earpiece, which improves the universality of the glasses. Through the compression spring, both the fixing and disassembling of the lens assembly can be realized, which facilitates the cleaning and replacement of the lenses.

The first and second ends of the compression spring are respectively limited between the buckle piece and the second body. It can realize the fixing and disassembling of the lens assembly under the cooperation of buckle piece and first end of the compression spring; And it can realize the adjustment of opening range of the earpiece under the cooperation of the second body and second end of the compression spring, so as to meet the requirements of different wearers. By utilizing the scalability of the compression spring, the example can realize the bidirectional utilization of two ends of the compression spring, namely, both the detachable function of the lens assembly and the adjustment of the opening range of the earpiece can be realized through a compression spring, which improves the universality of the glasses and eliminates the use of additional parts. Through the compression spring, both the fixing and disassembling of the lens assembly can be realized, which facilitates the cleaning and replacement of the lenses.

BRIEF DESCRIPTION

Some of the embodiments will be described in detail, with reference to the following figures, wherein like designations denote like members, wherein.

SPECIFIC IMPLEMENTATION

Figure 1:
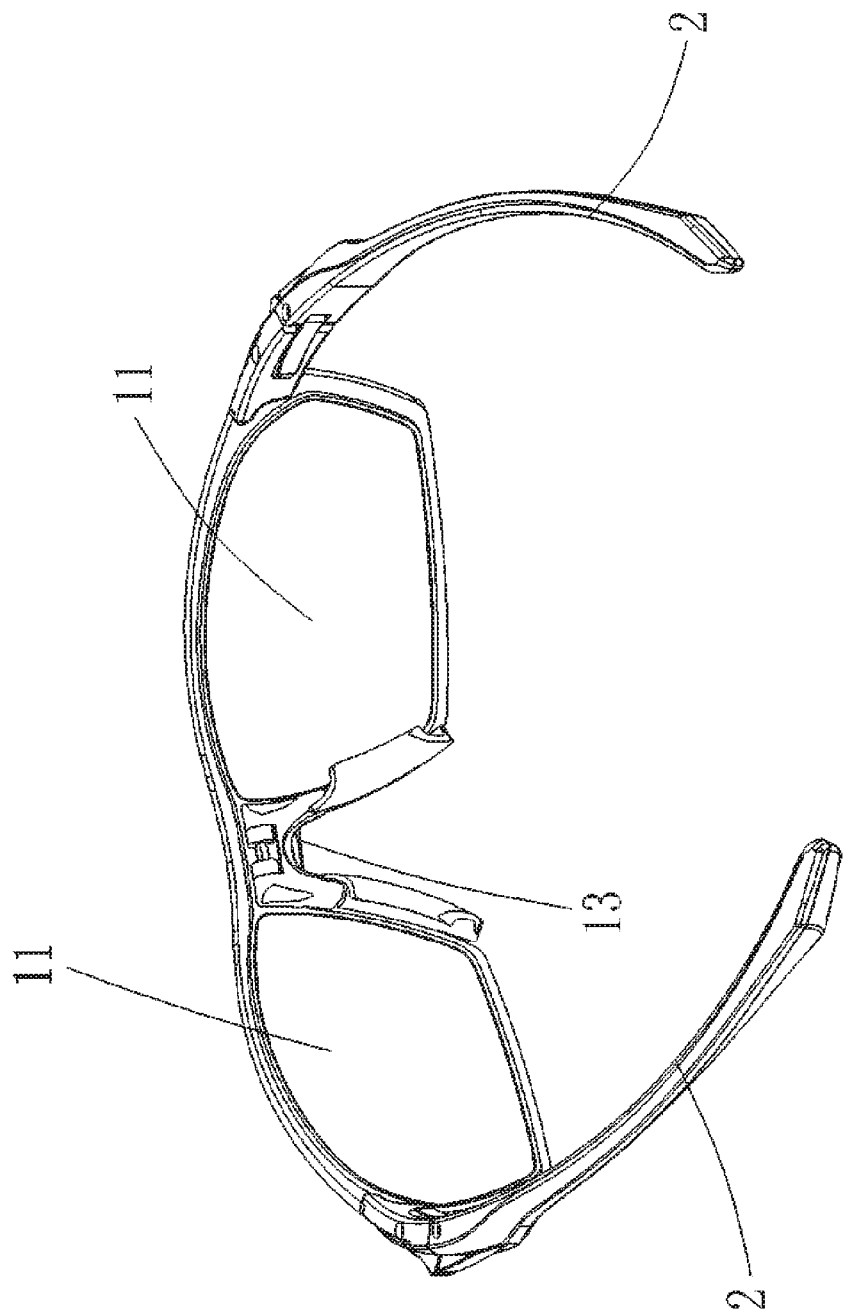
FIG. 1 is a structural drawing of a composite glasses structure in the first state.

For the purpose of more clearly highlighting the aim, technical schemes and advantages of the embodiments of the invention, the technical schemes in the embodiments of the invention are to be described clearly and completely in conjunction with the figures in the embodiments. Obviously, the described embodiments are only part of the embodiments of the invention rather than the complete embodiments. Based on the embodiments in the invention, all other embodiments made by ordinary technical personnel in this field without any creative efforts are within the protection scope of the invention.

DETAILED DESCRIPTION

Figure 2:
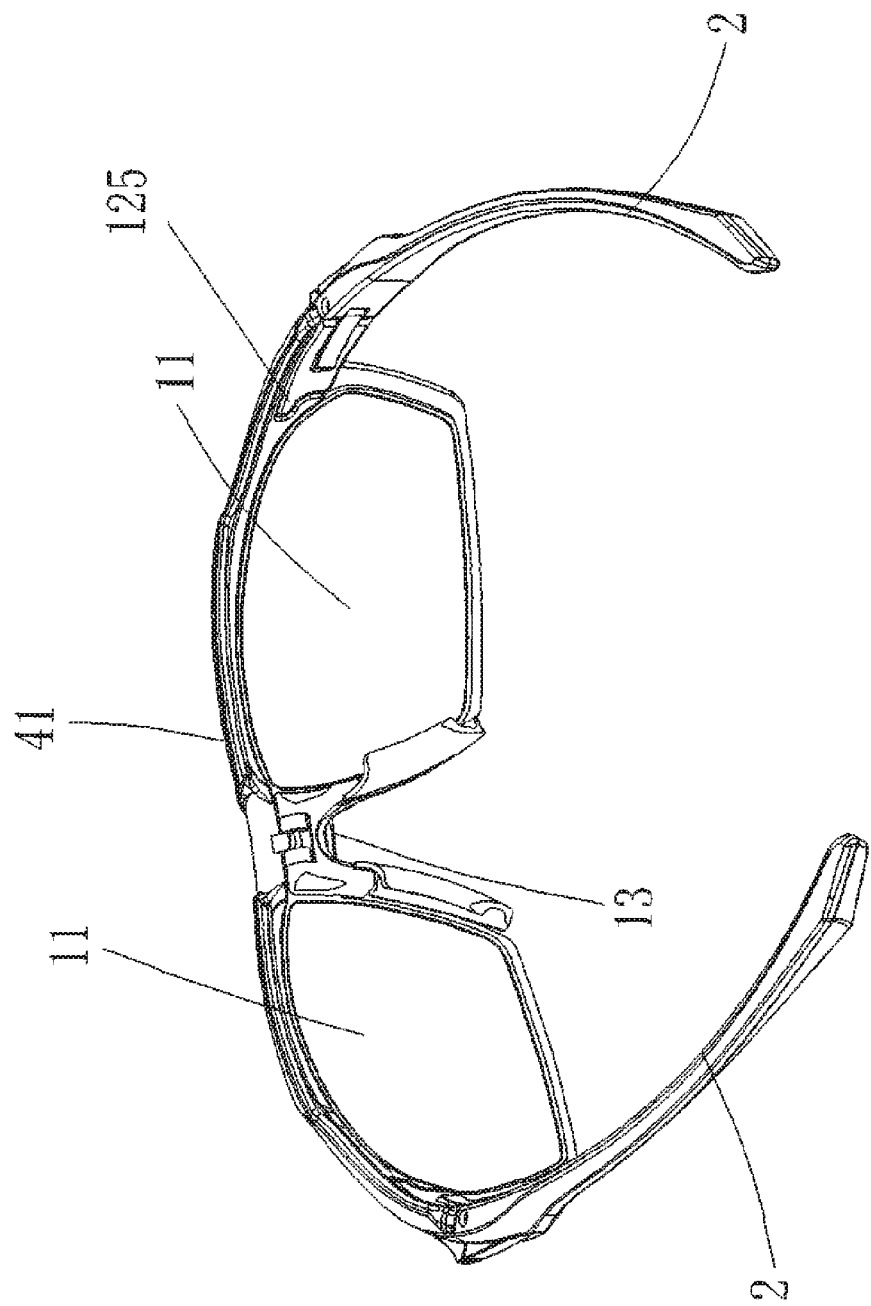
FIG. 2 is a structural drawing of a composite glasses structure in the second state.
Figure 3:
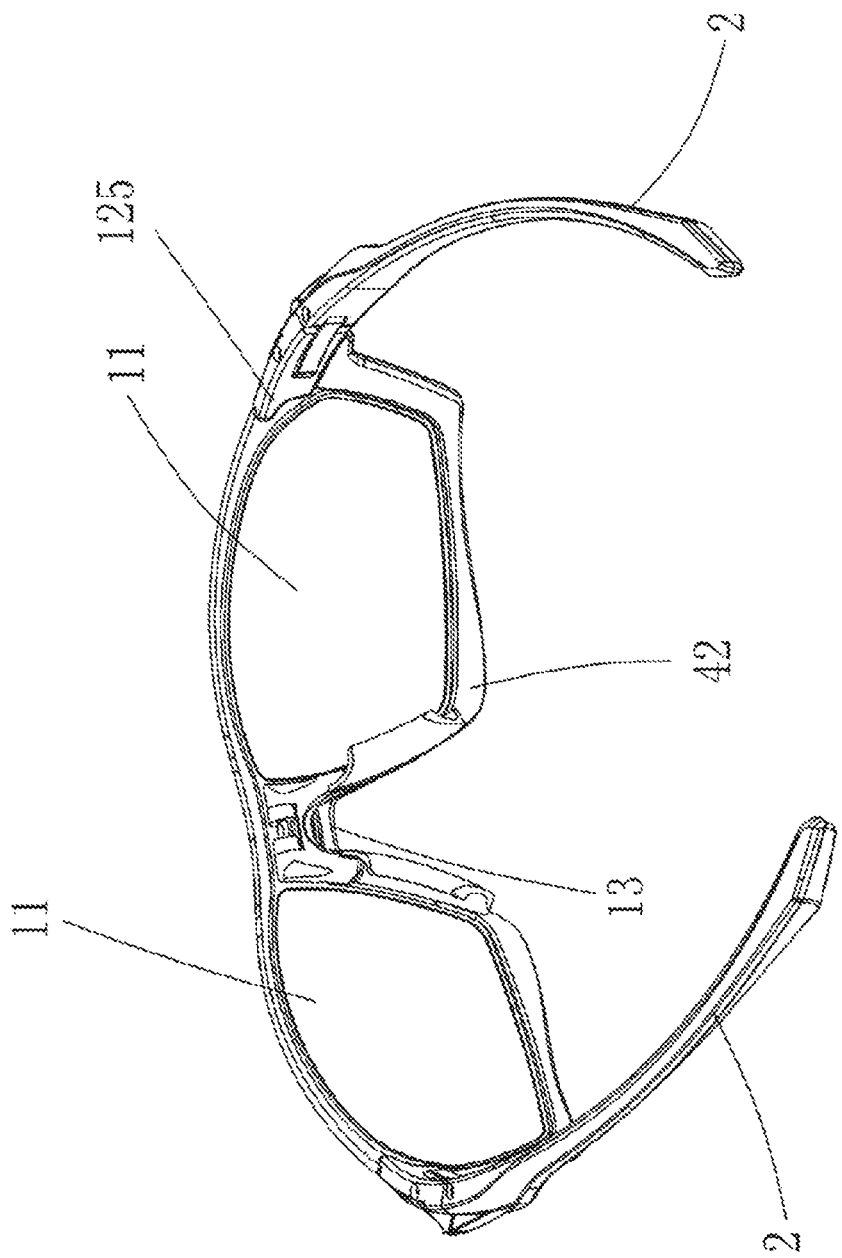
FIG. 3 is a structural drawing of a composite glasses structure in the third state.
Figure 4:
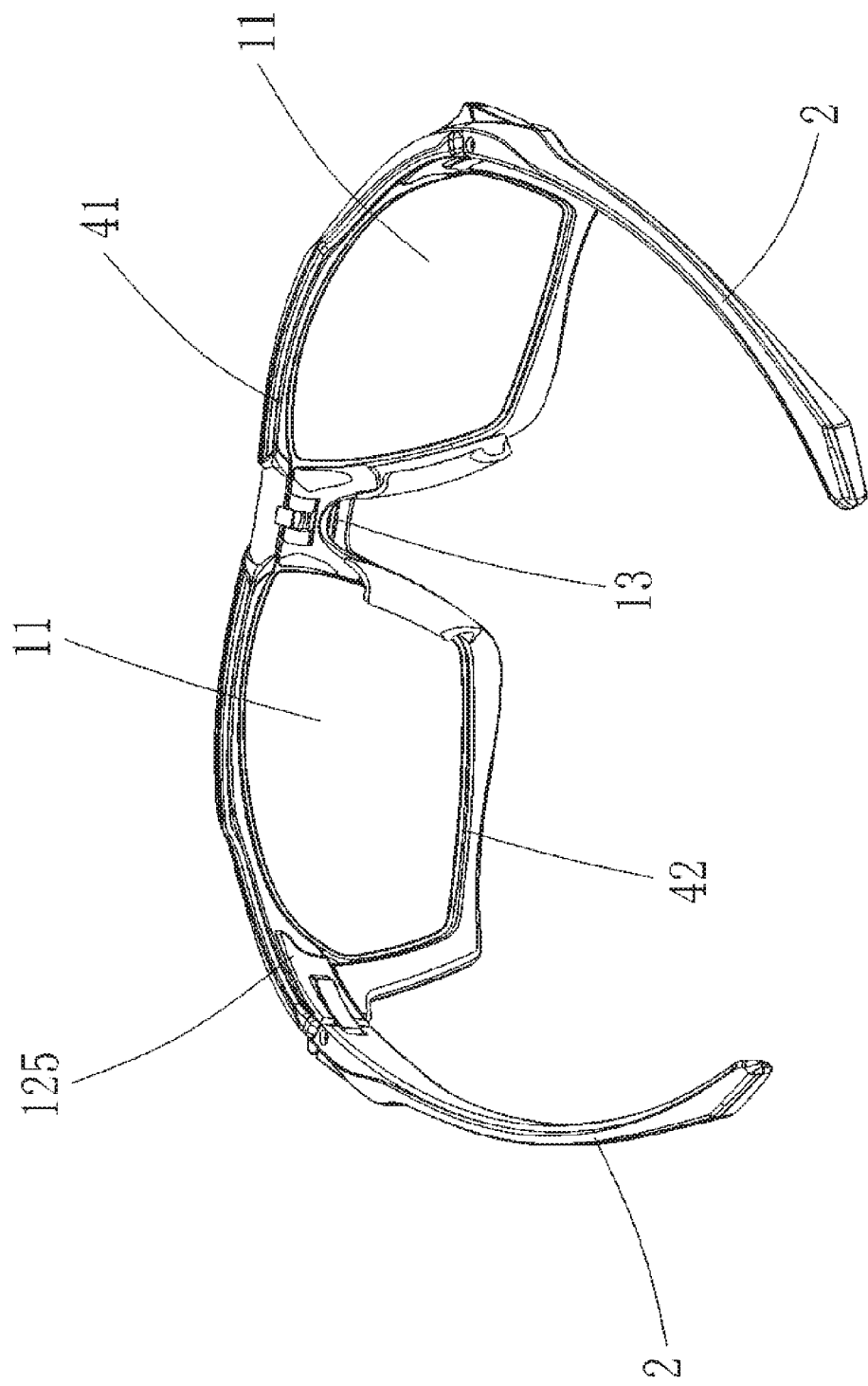
FIG. 4 is a structural drawing of a composite glasses structure in the fourth state.

The composite glasses structure, as shown in FIGS. 1-4, comprises a lens assembly, two earpieces 2, a rim assembly and a nose pad assembly. Wherein, the lens assembly comprises two lenses 11 and a cross beam 13 for connecting the two lenses 11; the two earpieces 2 are respectively detachably connected with the lens assembly; the rim assembly comprises an upper rim 41 and a lower rim 42 which are respectively detachably connected with the upper and lower edges of the lens assembly; and the nose pad assembly is arranged on the inner side of the cross beam 13 and is detachably connected with the cross beam 13, and it also can limit and fix the upper edge, lower edge, and upper rim 41 and/or lower rim 42 of the two lenses 11;

As shown in FIG. 1, the two earpieces 2 are respectively detachably connected to the lens assembly. The nose pad 53 assembly is detachably connected to the inner side of the cross beam 13 in the lens assembly. So the two earpieces 2, lens assembly and nose pad assembly can be combined to form the first state of glasses structure;

As shown in FIG. 2, the two earpieces 2 are respectively detachably connected to the lens assembly. The upper rim 41 in the rim assembly is detachably arranged on the upper edge of the two lenses 11 in the lens assembly. The nose pad assembly is detachably connected to the inner side of the cross beam 13 in the lens assembly, and it can limit and fix the upper rim 41 arranged on the upper edge of the two lenses 11. So the two earpieces 2, lens assembly, nose pad assembly and upper rim 41 of the rim assembly can be combined to form the second state of glasses structure;

As shown in FIG. 3, the two earpieces 2 are respectively detachably connected to the lens assembly. The upper rim 42 in the rim assembly is detachably arranged on the upper edge of the two lenses 11 in the lens assembly. The nose pad assembly is detachably connected to the inner side of the cross beam 13 in the lens assembly, and it can limit and fix the lower rim 42 arranged on the upper edge of the two lenses 11. So the two earpieces 2, lens assembly, nose pad assembly and lower rim 42 of the rim assembly can be combined to form the third state of glasses structure;

As shown in FIG. 4, the two earpieces 2 are respectively detachably connected to the lens assembly. The upper rim 41 and lower rim 42 in the rim assembly are respectively detachably arranged on the upper and lower edges of the two lenses 11 in the lens assembly. The nose pad assembly is detachably connected to the inner side of the cross beam 13 in the lens assembly, and it can limit and fix the upper rim 41 and lower rim 42 arranged on the upper and lower edges of the two lenses 11. So the two earpieces 2, lens assembly, nose pad assembly and upper rim 41 and lower rim 42 of the rim assembly can be combined to form the fourth state of glasses structure;

Through the detachable connection of the rim assembly and lenses in the lens assembly, the embodiment can realize the rimless, semi-rimless (upper rim or lower rim) and full-rim functions of the composite glasses. When carrying out different sports, it only needs to disassemble or assemble the upper and lower rims of the rim assembly. Therefore, the consumer can use the rimless, semi-rimless and full-rim functions only through one pair of glasses, which decreases the cost and increases the convenience to carry and use for the simple structure, convenient assembling and disassembling.

Figure 5:
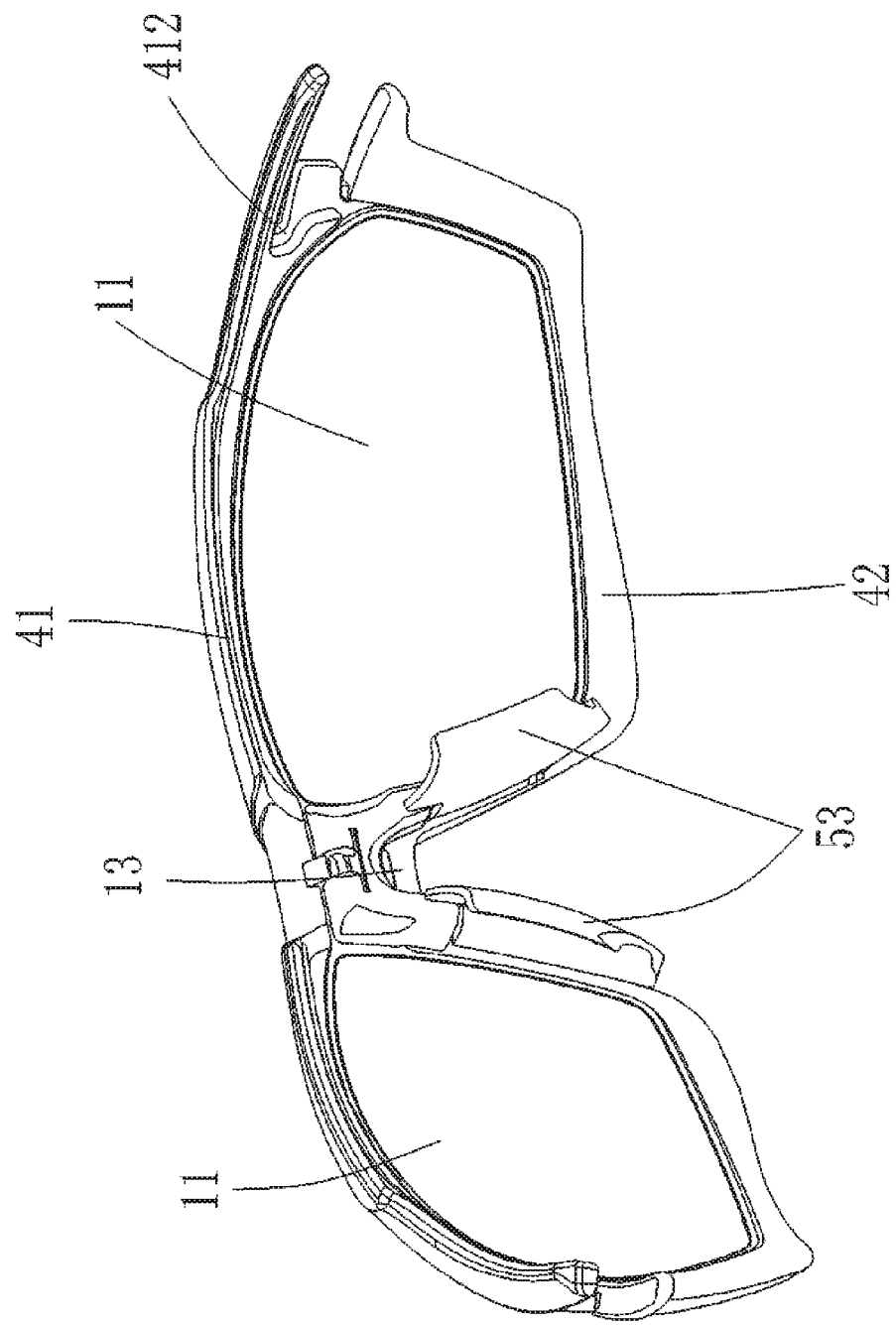
FIG. 5 is a structural drawing of a composite glasses structure in FIG. 4 without earpieces and articulating mechanisms.
Figure 6:
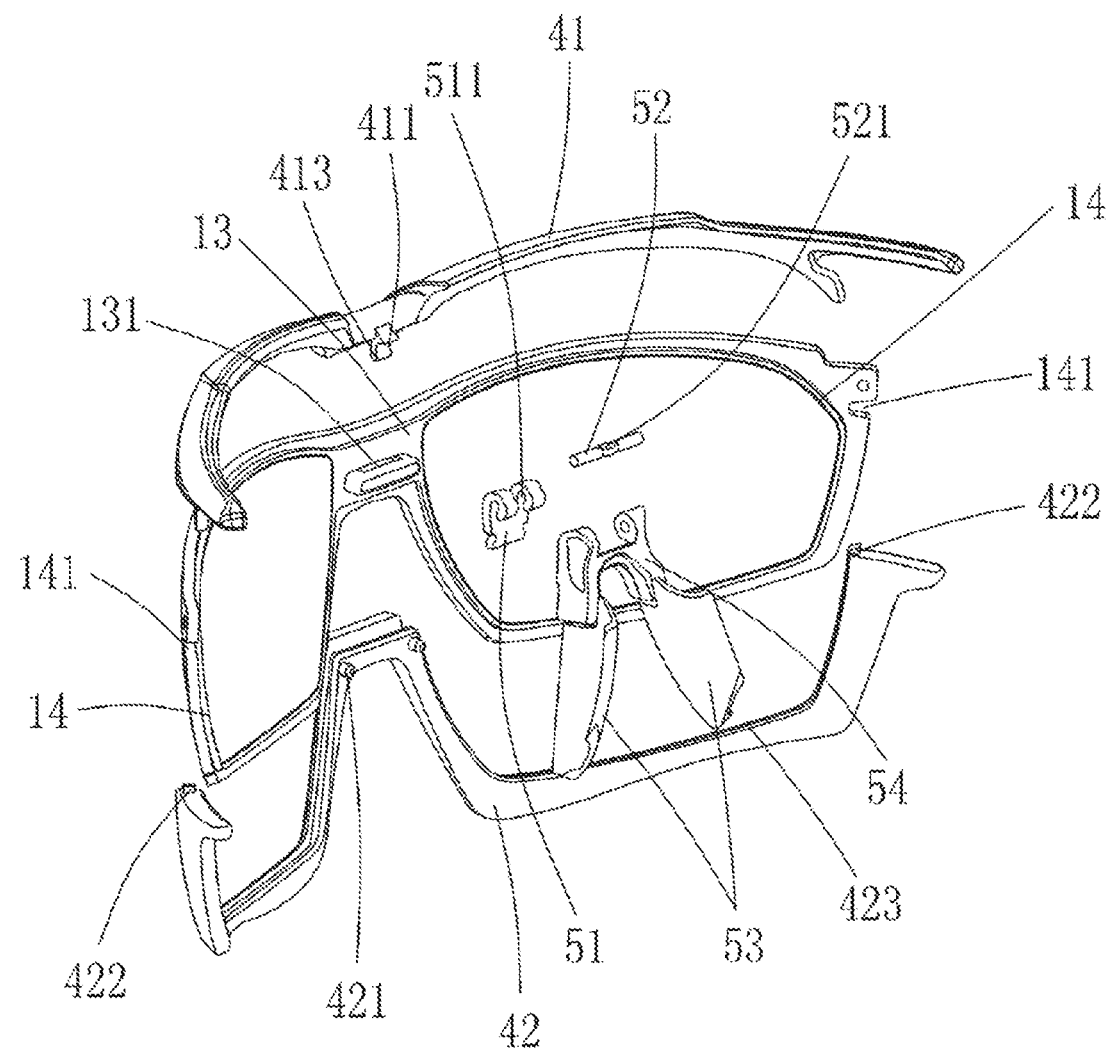
FIG. 6 is a breakdown drawing of FIG. 5.
Figure 7:
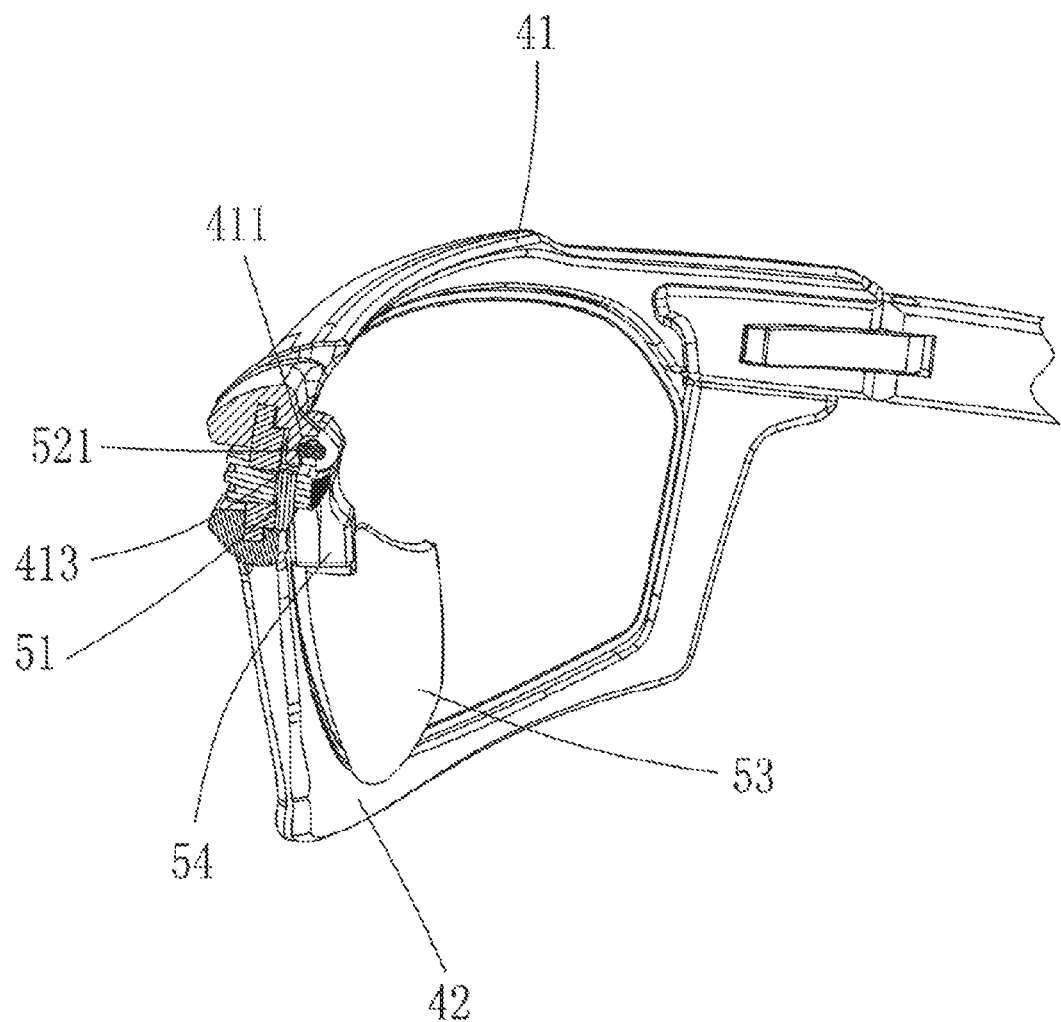
FIG. 7 is a schematic diagram of upper rim in FIG. 5 in fixing state.
Figure 8:
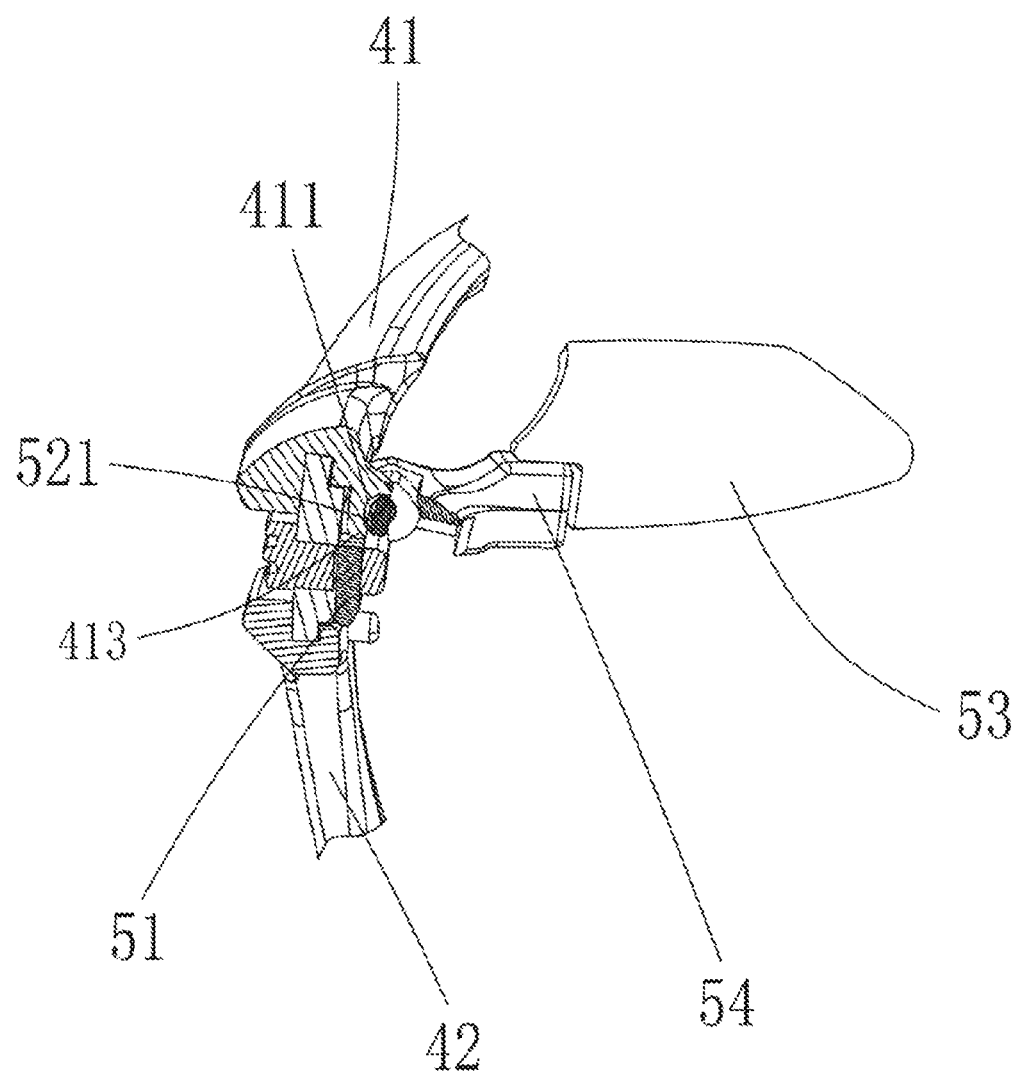
FIG. 8 is a schematic diagram of upper rim in FIG. 5 in freeing from fixing state.
Figure 9:
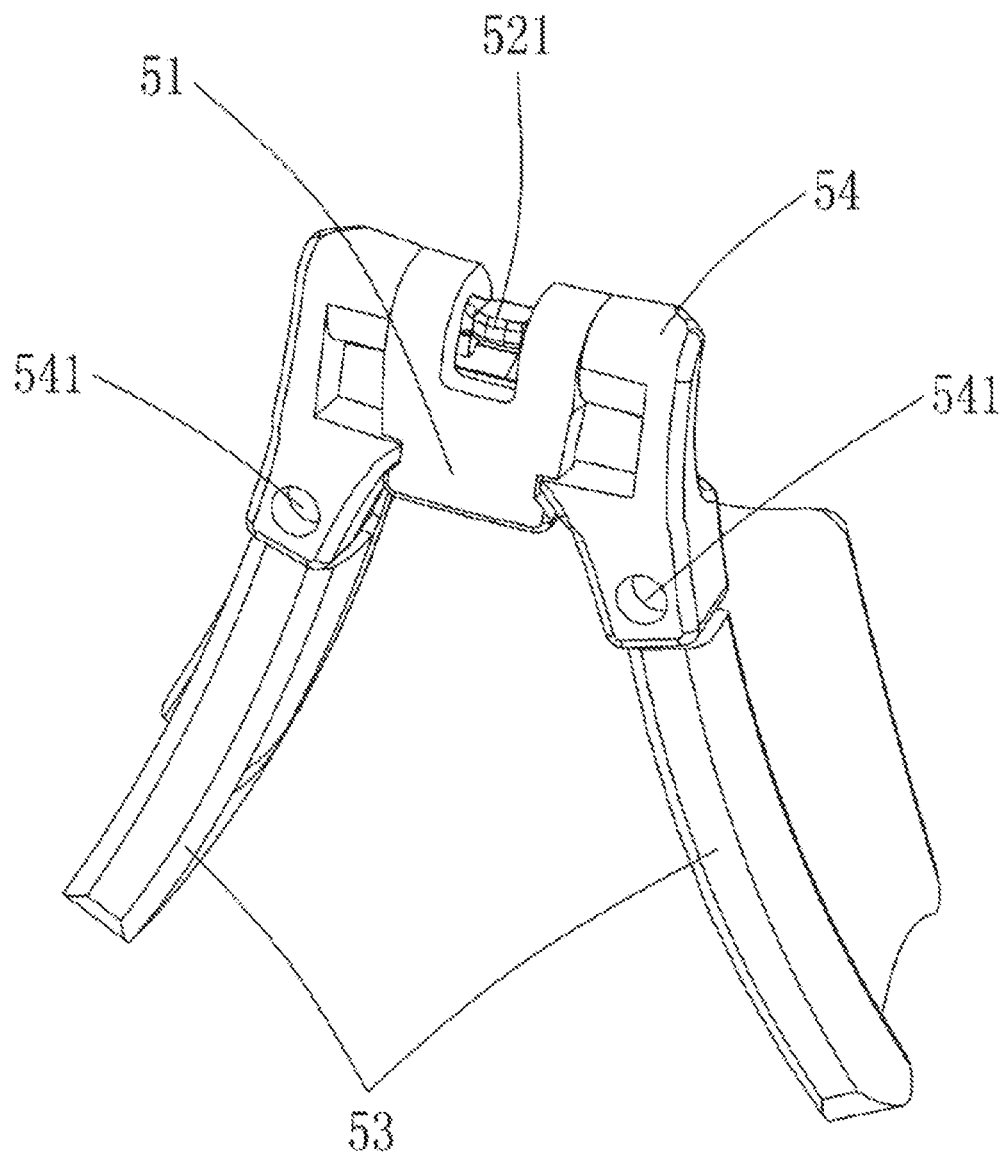
FIG. 9 is a structural drawing of nose pad assembly of a composite glasses structure.
Figure 10:
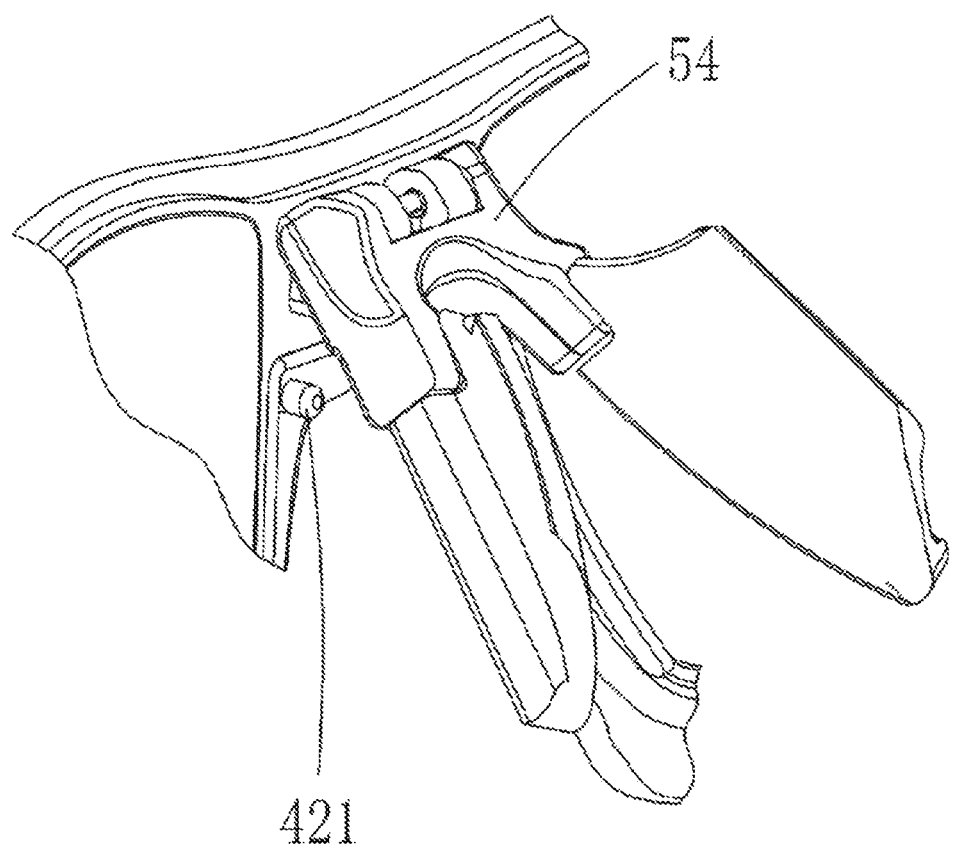
FIG. 10 is a schematic diagram of partial structures when the lower rim of a composite glasses structure is freed from fixing state.

On the basis of the above preferred embodiment and with reference to FIG. 5, FIG. 6 and FIG. 9, the inner side of the cross beam 13 of the lens assembly is provided with a mounting part 131, and the nose pad assembly includes a rotating assembly which can be removably connected with the mounting part 131. The rotating assembly can rotate relative to the mounting part 131, and is provided with a first limiting part 521. The upper rim 41 in the rim assembly is provided with a first fitting part 411 which can cooperate with the first limiting part 521;

As shown in FIG. 7, when the rotating assembly in the nose pad assembly rotates to a first position which can fit with the nose beam of human body, the first limiting part 521 of the rotating assembly can be rotated to the first position 41 which is counterbalanced by the first fitting part 411 of the lower rim to limit and fix the lower rim 41;

As shown in FIG. 6 and FIG. 8, when the rotating assembly in the nose pad assembly is rotated from the first position to the second position along the direction away from the cross beam 13, the first limiting part 521 of the rotating assembly can be separated from the first fitting part 411 of the upper rim 41 to free the upper rim 41 from the rotating assembly.

On the basis of the above preferred embodiment and with reference to FIG. 5, FIG. 6 and FIG. 9, and the rotating assembly comprises the nose pad 53, rotating shaft 52 and connecting piece 54 for connecting nose pad 53 and rotating shaft 52. The nose pad 53 is fixed on the connecting piece 54. The connecting piece 54 is connected with the rotating shaft 52 and can drive the rotating shaft 52 to rotate. The rotating shaft 52 are removably positioned on the mounting part 131 on the inner side of the cross beam 13.

As shown in FIG. 5, FIG. 6 and FIG. 9, first limiting block is arranged on the rotating shaft 52 as the first limiting part 521 of the rotating assembly, and a first limiting groove is arranged on the upper rim 41 in the rim assembly as the first fitting part 411 of the upper rim 41. When the rotating assembly is rotated to the first position, the first limiting block is counterbalanced by the first limiting groove to limit and fix the upper rim 41, and when the rotating assembly is rotated to the second position, the first limiting block is separated from the first limiting groove to free the upper rim 41.

On the basis of the above preferred embodiment and with reference to FIG. 5, FIG. 6, FIG. 9 and FIG. 15, the first limiting block is provided with a abdicating groove surface 5211 and a convex part 5212 which is formed through the inward concaving of the rotating shaft 52, and the extension of the first limiting block to the outer side of the abdicating groove surface 5211. The lower end of the first limiting groove on the upper rim 41 is provided with a limiting hook 413 which extends at a certain distance to the inner side of the upper rim 41;

When the rotating assembly is rotated to the first position, the limiting hook 413 can abut on the convex part 5212 of the first limiting block, and when the rotating assembly is rotated to the second position, the abdicating groove surface 5211 can be rotated to the side close to the limiting hook 413, and interference is not generated on the limiting hook 413 when the upper rim 41 is removed.

On the basis of the above preferred embodiment and with reference to FIG. 5, FIG. 6 and FIG. 9, the rotating assembly comprises the second limiting part 541, and a first limiting groove is arranged on the lower rim 42 in the rim assembly as the second fitting part 421 of the lower rim 421. As shown in FIG. 5, FIG. 6, FIG. 7 and FIG. 9, the rotating assembly in the nose pad assembly rotates to the first position which can fit with the nose beam of human body, the second limiting part 541 of the rotating assembly can rotate to the position which is counterbalanced by the second fitting part 421 of the lower rim 42 to limit and fix the lower rim 42;

As shown in FIG. 5, FIG. 6, FIG. 9 and FIG. 10, when the rotating assembly in the nose pad assembly rotates from the first position to the third position along the direction away from the cross beam 13, the second limiting part 541 of the rotating assembly can be separated from the second fitting part 421 of the lower rim 42 to free the lower rim 42 from the rotating assembly.

On the basis of the above preferred embodiment and with reference to FIG. 5, FIG. 6, FIG. 7, FIG. 9 and FIG. 10, the connecting piece 54 of the rotating assembly is arranged at the second limiting groove as the second limiting part 541 of the rotating assembly, and the lower rim 42 is arranged at the second limiting block as the fitting part 421 of the lower rim 42.

When the rotating assembly rotates to the first position, the second limiting block is counterbalanced by the second fitting part 421 to limit and fix the lower rim 42, and when the rotating assembly rotates to the third position, the second limiting block is separated from the second fitting part 421 to free the lower rim 42.

On the basis of the above preferred embodiment and with reference to FIG. 5, FIG. 6, FIG. 7, FIG. 9 and FIG. 10, the second limiting groove is a columnar groove, and the second limiting block is a columnar bump, and the columnar groove can be sleeved on the columnar bump.

On the basis of the above preferred embodiment and with reference to FIG. 5 and FIG. 6, the nose pad assembly further comprises a connecting piece 51 which is pivotally connected with a rotating shaft 52 in the rotating assembly. The inner side of the cross beam 13 is provided with a first mounting hole as the first mounting part 131 of the cross beam 13, and the connecting piece 51 in the nose pad assembly 53 can be removably inserted and connected with the first mounting hole to position the rotating shaft.

On the basis of the above preferred embodiment and with reference to FIG. 5 and FIG. 6, the connecting piece 51 is provided with a first end and a second end. The first end can be inserted into the first mounting hole arranged on the inner side of the cross beam 13, and the second end is provided with two grooves 511. The rotating shaft 52 can match with the two grooves 511 and can rotate relative to the grooves. The two grooves 511 are respectively positioned on two sides of the first limiting block on the rotating shaft 52.

On the basis of the above preferred embodiment and with reference to FIG. 5 and FIG. 6, the lens assembly further comprises lens inner rim with two glass rings 14 into which the two lenses 11 in the lens assembly can be arranged respectively. The lens 11 inner rim between the two glass rings 14 forms the cross beam 13;

In the embodiment, the lens can be detached to facilitate the replacement of different materials and different types of lenses. For example, myopic persons can change myopia lenses, and tourists can change anti-ultraviolet lenses, etc., to meet the needs of different users.

On the basis of the above preferred embodiment and with reference to FIG. 1, the two earpieces 2 are respectively removably connected with the lens assembly in snap-in type through the earpieces articulating mechanism, one end of which is used for pivoting the earpieces 2, and the other end is used for disassembling and connecting the lens assembly.

In the embodiment, the removable connection of the earpieces and lenses assembly can be realized through setting the earpiece articulating mechanism.

Figure 11:
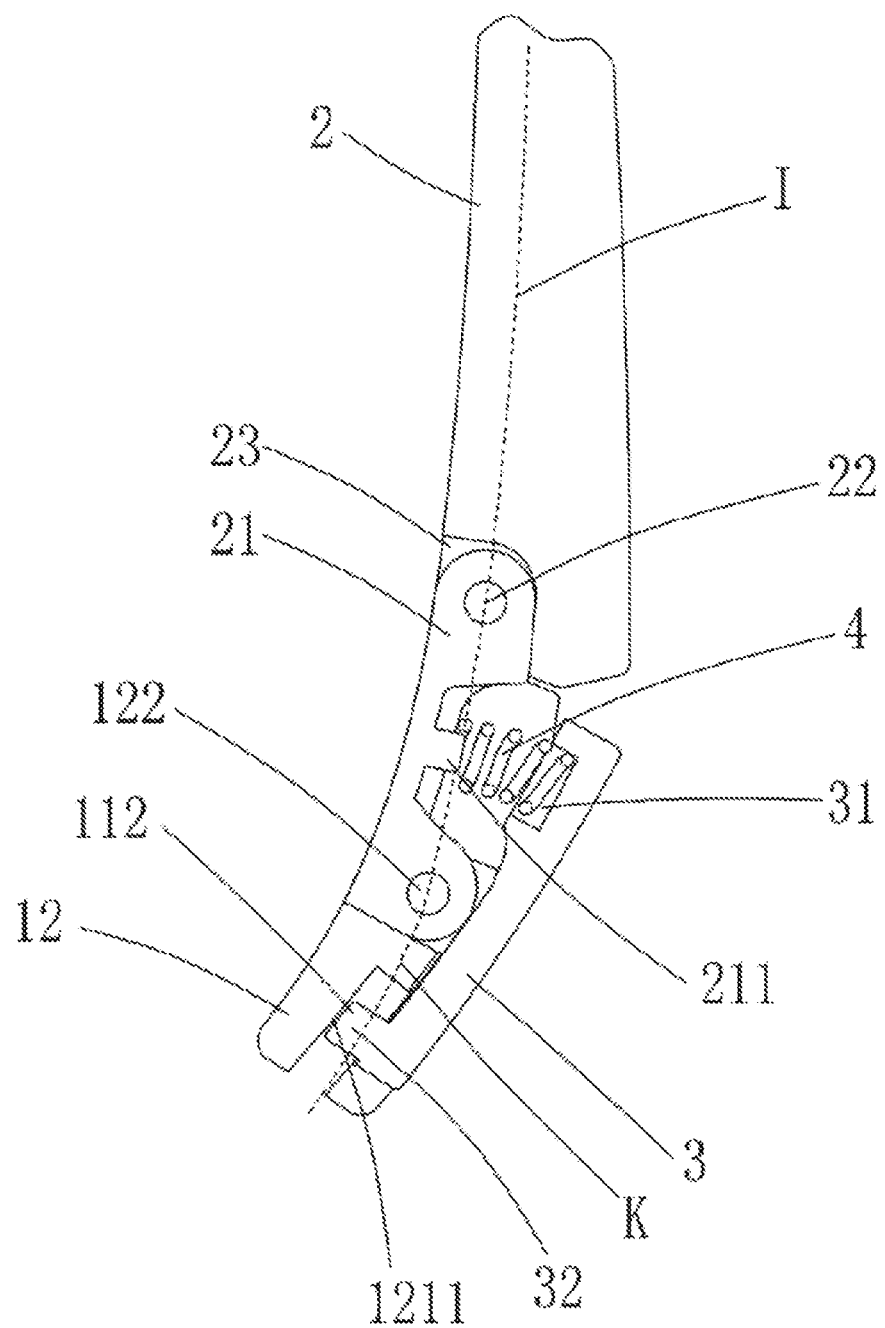
FIG. 11 is a broken-out section view of FIG. 1.
Figure 12:
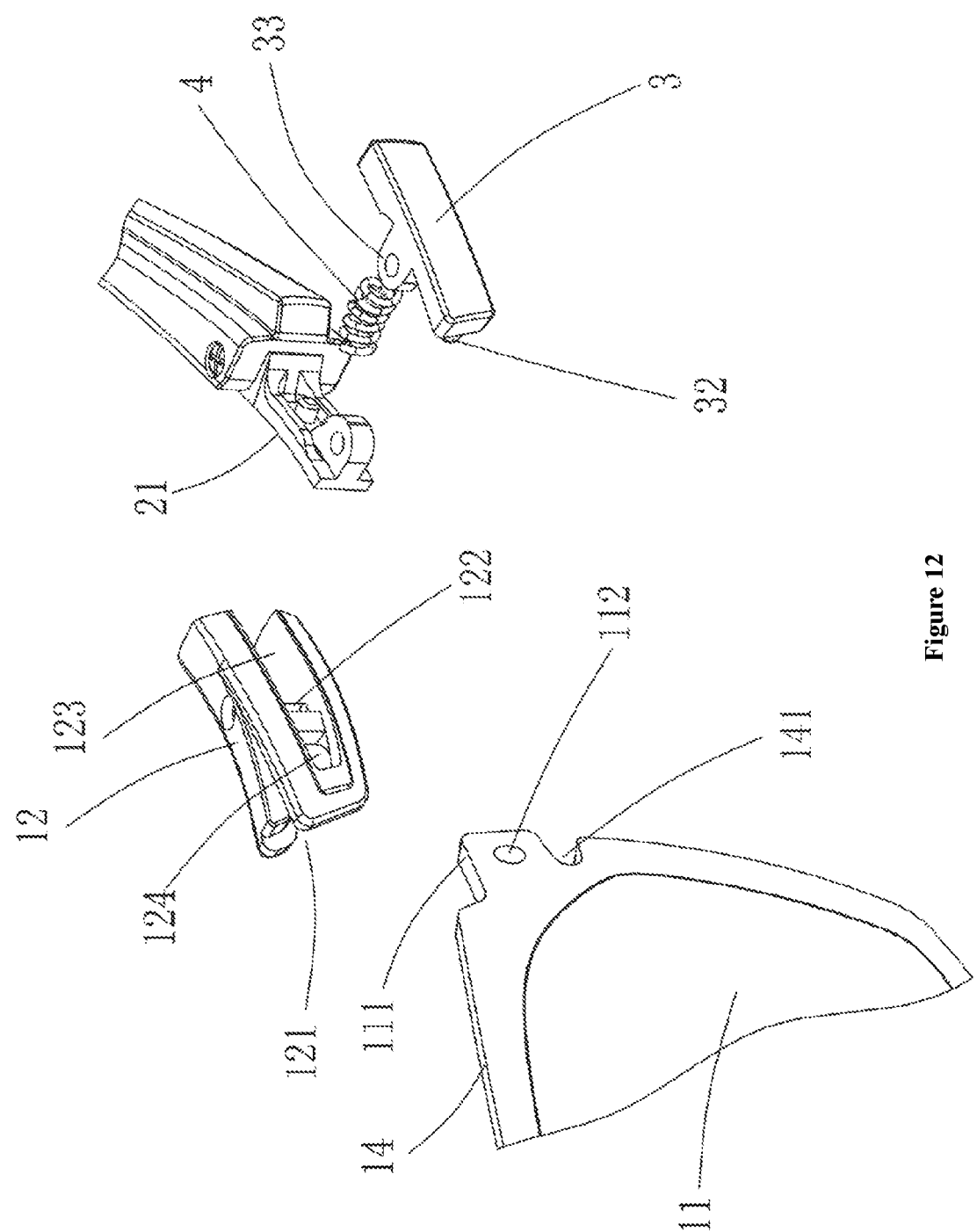
FIG. 12 is a partial breakdown drawing of FIG. 1.
Figure 13:
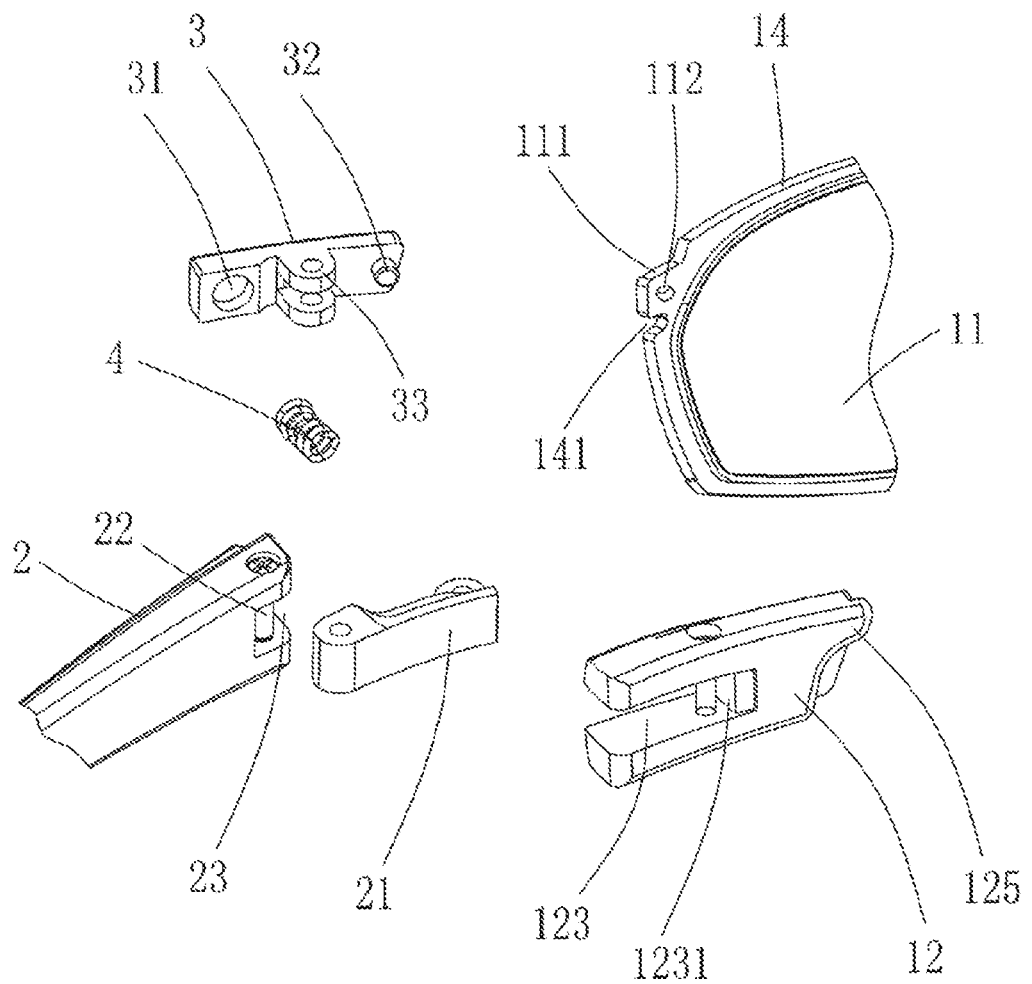
FIG. 13 is a partial breakdown drawing of FIG. 1 in another angle.
Figure 14:
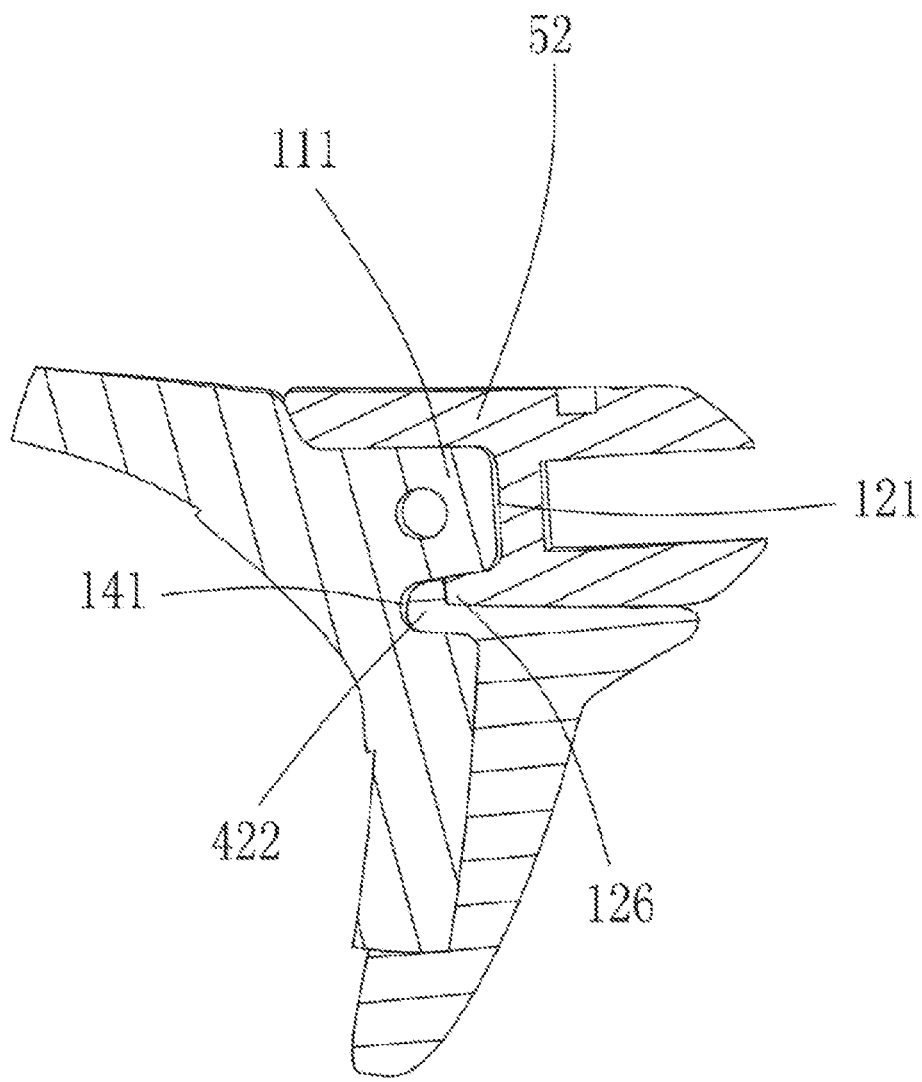
FIG. 14 is a broken-out section view of a composite glasses structure.
Figure 15:
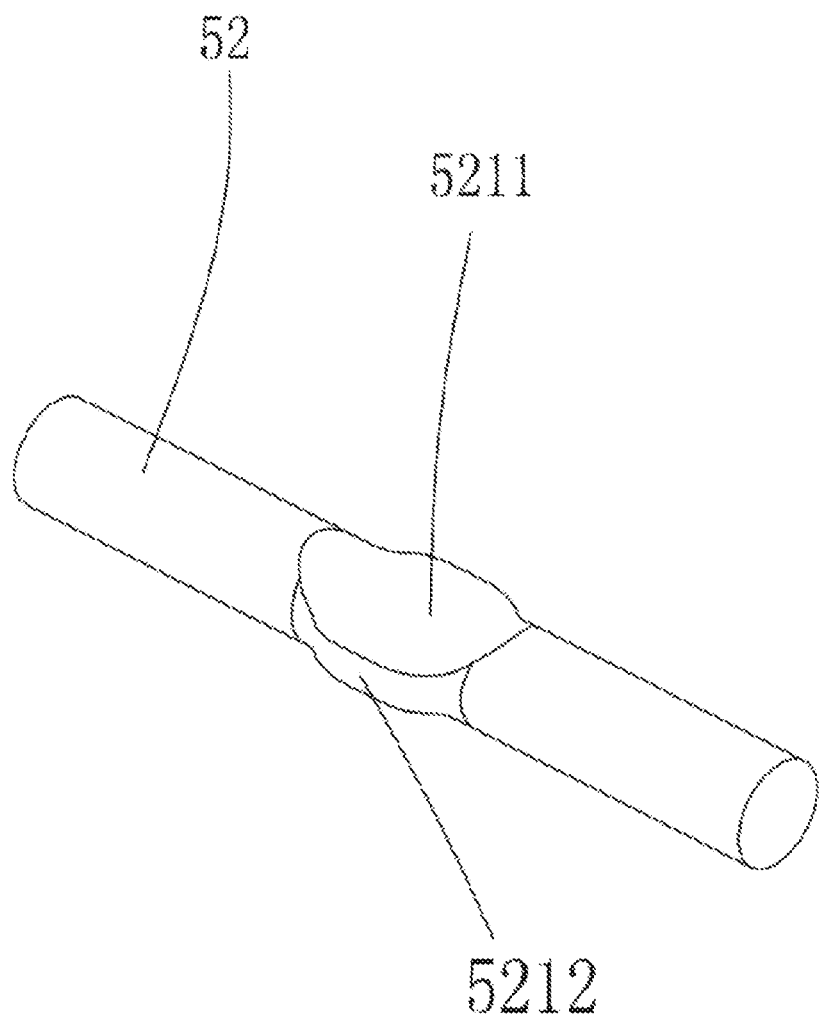
FIG. 15 is a structural drawing of rotating shaft of a composite glasses structure.

On the basis of the above preferred embodiment and with reference to FIG. 11-13, the earpieces articulating mechanism comprises the first body 12 and the second body 21. The first body 12 is used for disassembling and connecting the lens assembly in snap-in type. It is provided with a pivot interface 123 in which the first pivot shaft 122 is arranged. The second body 21 is provided with a first end and a second end. Wherein the first end is pivotally connected to the first pivot shaft 122 in the pivot interface 123 and can abut against the inner wall 1231 of the first body 12 pivot interface 123, and the second end is pivotally connected with the pivot end of the earpiece 2. The side opposite to the second body is provided with a buckle piece 3, which is optimized and can be set on the outer side opposite the second body 21 for operating the buckle piece 3, and wearing glasses. The buckle piece 3 is provided with a first end and a second end. A pivot point 33 is arranged between the first end and the second end and is also pivotally connected with the first pivot shaft 122 in the pivot interface 123. A compression spring 4 is arranged between the first end of the buckle piece 3 and the second body 21, and two ends of the compression spring are limited between the first end of the buckle piece 3 and the second body 21. The second end of the buckle piece 3 is provided with a fixing part 32 for buckling the lens assembly;

Depending on the elastic force of the first end of the compression spring 4 on the first end of the buckle piece 3, the second end of the buckle piece 3 can be pressed against the first body 12, so that the lens assembly can be fixed under the cooperation of the fixing part 32 of the second end of the buckle piece 3 with the first body 12. Depending on the elastic force of the second end of the compression spring 4 on the second body 21, the second body 21 can be pressed against the first body 12;

When press the first end of the buckle piece 3 to compress the compression spring 4, the second end of the buckle piece 3 can be rotated at a certain range, and the fixing part 32 of the second end of the buckle piece 3 can be matched with the first body 12 to free the lens assembly its being disassembled;

After the earpiece 2 is fully unfolded, the pivot end of the earpiece 2 can abut on the second end of the second body 21, so that the earpiece 2 can drive the second body 21 to outward rotate a certain range around the first pivot shaft 122 from the fully unfolded position, and the compression spring 4 can be further compressed by the second body 21.

Referring to FIG. 11 to FIG. 13, lens assembly is fixed in the embodiment, depending on the elastic force of the first end of the compression spring on the first end of the buckle piece, the compression spring can withstand the first end of buckle piece, the second end of the buckle piece can be pressed against the first body, so that the lens assembly can be fixed under the cooperation of the fixing part of the second end of the buckle piece with the first body; depending on the elastic force of the second end of the compression spring on the second body, the first end of the second body can be pressed against the inner wall of pivot interface of the first body; depending on the interaction force between the second body and compression spring, the compression spring can be pressed, to fix lens assembly continuously;

When the lens assembly needs to be disassembled in the embodiment, the first end of the buckle piece is pressed to compress the compression spring and the second end of the buckle piece can be rotated at a certain range; so that the fixing part of the second end of the buckle piece can be matched with the first body to free the lens assembly for its being disassembled;

After the earpieces are fully unfolded, the pivot end of the earpiece can abut on second end of the second body, so that the earpiece can drive the second body to outward rotate a certain range around the first pivot shaft from the fully open position, and the compression spring can be further compressed. For the size of the wearers' heads are different, when wearing glasses, the second end of the second body can compress and press the compression spring at a certain range; at the same time, depending on the elastic force to the second body on compression spring, the earpieces can be firmly clamped on the wearer's head and increasing wearing comfort.

The first and second ends of the compression spring are respectively limited between the buckle piece and the second body. It can fix and disassemble the lens assembly under the cooperation of buckle piece and first end of the compression spring; and it can realize the adjustment of unfolding range of the earpieces under the cooperation of the second body and second end of the compression spring, to meet the requirements of different wearers. By utilizing the scalability of the compression spring, the embodiment can realize the bidirectional utilization of two ends of the compression spring, namely, both the detachable function of the lens assembly and the adjustment of the opening range of the earpiece can be realized through a compression spring, which improves the universality of the glasses and eliminates the use of additional parts.

Through setting compression spring in the embodiment, both the fixing and disassembling of the lens assembly can be realized, to clean and replace the lenses.

On the basis of the above preferred embodiment and with reference to FIG. 11-13, the end part of the first body 12 in the articulating mechanism is convexly provided with a fourth limiting block 125 as the fourth limiting part of the earpiece articulating mechanism. The two ends of the upper rim 41 are respectively provided with a fourth limiting groove 412 as a fourth fitting part of the upper rim. The fourth limiting part of the articulating mechanism can be matched with the fourth fitting part at the two ends of the upper rim 41 to limit and fix the upper rim 41.

In the embodiment, the earpiece articulating mechanism can realize better fixing and limiting of the two ends of the upper rim and ensure the reliability and immobility of the composite glasses structure.

Referring to FIG. 5, FIG. 6 and FIG. 11 to FIG. 14, a lower groove 423 is provided along the extending direction of the lower rim 42, and the lower edge of the lens assembly can cooperate with the lower groove 423. According to the above embodiment, for the optimized, the edge of the lens assembly is convexly provided with a connecting part 111, and a third limiting groove 141 below the connecting part 111, the two ends of the lower rim 42 are respectively provided with a third limiting block 422 at both ends of the lower groove 423. The third limiting block 422 can be fitted in the third limiting groove 141 close to the inner wall. When the lower edge of the lens assembly fits into the lower groove 423, the third limiting block 422 can be locked in the third limiting groove 141 so as to limit and fix both ends of the lower rim 42 to the lens assembly; in addition to the limitation of the nose pad assembly to the middle of the lower rim 42, the lower rim 42 can be fixed. However, for a certain elasticity of the lower rim 42, the third limiting block 422 is likely to be pulled out of the third limiting groove 141. The edge of the first body 12 is provided with an accommodating groove 121 matched with the connecting part 111. A limiting bump 126 is convexly formed on the inner wall of the accommodating groove 121 which can be assembled into the third limiting groove 141 and bears against the outer side of the third limiting block 422. The limiting bump 126 can limit and fix the position of the third limiting block 422 so that the third limiting block 422 can be prevented from being pulled out of the third limiting groove 141.

In the embodiment, it can achieve the fixing of two ends of the lower rim under the third limiting block and third limiting groove, so as to better limit the lower rim, and ensure the reliability and immobility of the composite glasses structure.

On the basis of the above preferred embodiment and with reference to FIGS. 11~13, the earpiece 2 pivot end is provided with a limiting notch 23, in which a second pivot shaft 22 is arranged. The second end of the second body 21 is pivotally connected to the second pivot shaft 22. After the earpiece 2 is fully opened, the second end of the second body 21 can be abutted against the inner wall of the limiting notch 23 at the earpiece 2 pivot end. Certainly, within the knowledge scope of technicians in the technical field, other alternative structures can be used to achieve the abutment of earpiece 2 pivot end against the second end of the second body 21 after earpiece 2 is fully opened, so that the earpiece 2 can drive the second body 21 to outward turn a certain range around the first pivot shaft 122 from the fully open position, and the compression spring 4 can be further compressed by the second body 21.

On the basis of the above preferred embodiment and with reference to FIGS. 11~13, when the earpiece 2 is in fully open position, the earpiece 2 pivot end can abut and match with the second end of the second body 21, and the second body 21 is roughly on the same axis as the earpiece 2, and the axis is shown as Line I in FIG. 2, so that the earpieces can be fully opened without bending inward and affecting the user's wearing.

On the basis of the above preferred embodiment and with reference to FIGS. 11~13, the two ends of the compression spring 4 are respectively abutted against the area between first end of the buckle piece 3 and second body 21, and the first body 12 and the second body 21 are roughly on the same axis, and the axis is shown as Line K in FIG. 2, so that the overall design of the glasses is coordinated and natural. When the preferred earpiece 2 is in fully open position, the inner sides of the first body 12, second body 21 and earpiece 2 are roughly on the same surface to further improve the aesthetics and coordination of glasses.

On the basis of the above preferred embodiment and with reference to FIGS. 11~13, one side of the compression spring 4 limited by the buckle piece 3 is provided with a groove 31, and the first end of the compression spring 4 can match with the groove 31. One side of the compression spring 4 limited by the second body 21 is provided with a boss 211, and the second end of the compression spring 4 can be sleeved on the boss 211.

In the embodiment, the two ends of the compression spring can be respectively limited by the groove and boss to avoid the compression spring from movement and to ensure the stability of the structure. The compression spring can limit and fix the second body and buckle piece by the cooperation of two ends of the compression spring with the groove and boss, so as to achieve the fixing of the lenses.

On the basis of the above preferred embodiment and with reference to FIGS. 11~13, the edge of the lens assembly is convexly provided with a connecting part 111 on which a groove hole 112 is arranged. The edge of the first body 12 is provided with an accommodating groove 121 matched with the connecting part 111 and an abutting surface 1211 abutted and matched with the fixing part 32 at the second end of the buckle piece 3. The second end of the buckle piece 3 is provided with a buckle stand as the fixing part 32. The buckle stand can be inserted into the groove hole 112 on the connecting part 111 at the edge of earpiece 11 and abutted against the abutting surface 1211 to fix the lens assembly.

The lens assembly is directly connected with the first body in the embodiment. It can fix the lens assembly by the cooperation of fixing part at the second end of the buckle piece with the first body, so it is easy to assemble and disassemble for the simple structure.

Certainly, the fixing part of the second end of the buckle piece can fix the lens assembly in the embodiment, including the rimless lens assembly and semi-rimless and full-rim lens assemblies. However, the Chinese patent document CN204203562U is only implemented to fix the rimless lens assembly.

On the basis of the above preferred embodiment and with reference to FIGS. 11~13, the accommodating groove 121 on a side wall of the buckle piece 3 is provided with a via hole 124 which extends to the outer side of the first body 12 and is connected with the pivot interface 123 of the first body 12. The buckle stand can be matched with the groove hole 112 through the via hole 124.

Optionally, the lens assembly is an integral lens, (not shown in the figure), and the cross beam of the integral lens is formed between two lens zones. The mounting part may be screwed to the inner side of the cross beam on the integral lens. The connecting part and the third limiting groove may be directly arranged at the edge of the integral lens and form an unitary body with the integral lens. In the embodiment, the lens assembly adopting integral lens can still achieve the functions and effects of the above embodiment, which eliminates the use of inner rim of lens, simplifies the parts and saves the material.

A kind of rimless glasses with the composite glasses structure of any one of the above embodiments. The rimless glasses are combined in the first state of the composite glasses structure described above.

The rimless glasses in the embodiment can achieve the rimless function of the glasses. When playing golf, rimless glasses are usually used to avoid sight line blocking and ensure light sport.

A kind of semi-rimless glasses with the composite glasses structure of any one of the above embodiments. The semi-rimless glasses are combined in the second or third state of the composite glasses structure described above.

The rimless glasses in the embodiment can achieve the semi-rimless function of the glasses. When riding, semi-rimless (upper rim) glasses are used to ensure that sweat on the lenses is able to flow down.

A kind of full-rim glasses with the composite glasses structure of any one of the above embodiments. The full-rim glasses are combined in the fourth state of the composite glasses structure described above.

The full-rim glasses in the embodiment can achieve the full-rime function of glasses.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A composite glasses structure comprising:
   a lens assembly,
   two earpieces,
   a rim assembly, and
   a nose pad assembly,
   wherein the lens assembly comprises two lenses, a lens inner rim with two glass rings into which the two lenses in the lens assembly can be arranged respectively, and a cross beam between the two lenses;
   wherein the two earpieces are respectively detachably connected with the lens assembly;
   wherein the rim assembly comprises an upper rim and a lower rim which are respectively detachably connected with an upper edge and a lower edge of the lens inner rim of the lens assembly;
   wherein the nose pad assembly is arranged on an inner side of the cross beam and is detachably connected with the cross beam, and also limits and fixes the upper edge, the lower edge, and an upper rim and a lower rim of the two lenses;
   wherein, when the composite glasses structure is in a first state, the two earpieces are respectively connected to the lens assembly, and the nose pad assembly is connected to the inner side of the cross beam in the lens assembly;
   wherein, when the composite glasses structure is in a second state, the two earpieces are respectively connected to the lens assembly, the upper rim in the rim assembly is arranged on the upper edge of the lens inner rim of the lens assembly, the nose pad assembly is connected to the inner side of the cross beam of in the lens assembly, which limits and fixes the upper rim arranged on the upper edge of the two lenses;
   wherein, when the composite glasses structure is in a third state, the two earpieces are respectively connected to the lens assembly, the lower rim in the rim assembly is arranged on the lower edge of the lens inner rim of the lens assembly, the nose pad assembly is connected to the inner side of the cross beam of the lens assembly, which limits and fixes the lower rim arranged on the lower edge of the lens inner rim;
   wherein, when the composite glasses structure is in a fourth state, the two earpieces are respectively connected to the lens assembly, the upper rim and the lower rim in the rim assembly are respectively arranged on the upper edge and the lower edge of the lens inner rim of the lens assembly, the nose pad assembly is connected to the inner side of the cross beam in the lens assembly, which limits and fixes the upper rim and the lower rim arranged on the upper edge and the lower edge of the lens inner rim;
   wherein the inner side of the cross beam in the lens assembly is provided with a mounting part, and the nose pad assembly comprises a rotating assembly which is detachably connected with the mounting part;
   further wherein:
   the rotating assembly can turn relative to the mounting part, and is provided with a first limiting part, the upper rim in the rim assembly is provided with a first fitting part which can match with the first limiting part, when the rotating assembly in the nose pad assembly is rotated to a first position which is configured to fit with a human nose, the first limiting part of the rotating assembly can be rotated to a position which abut and match with the first fitting part of the upper rim to limit and fix the upper rim;

when the rotating assembly in the nose pad assembly is rotated from the first position to a second position along a direction away from the cross beam, the first limiting part of the rotating assembly can be separated from the first fitting part of the upper rim to free the upper rim;

wherein the rotating assembly comprises nose pads, a rotating shaft and connecting pieces for connecting the nose pads and the rotating shaft, the nose pads are fixed on the connecting pieces, the connecting pieces are connected with the rotating shaft and can drive the rotating shaft to turn, the rotating shaft are detachably positioned on the mounting part on the inner side of the cross beam;

further wherein a first limiting block is arranged on the rotating shaft as a first limiting part of the rotating assembly, and a first limiting groove is arranged on the upper rim in the rim assembly as a first fitting part of the upper rim, and when the rotating assembly is rotated to the first position, the first limiting block is counterbalanced by the first limiting groove to limit and fix the upper rim, and when the rotating assembly is rotated to the second position, the first limiting block is separated from the first limiting groove to free the upper rim.

2. The composite glasses structure, according to claim 1, wherein the rotating assembly further comprises a second limiting part, and the lower rim in the rim assembly is provided with a second fitting part matched with the second limiting part;

further wherein:

when the rotating assembly in the nose pad assembly is rotated to a first position which is configured to fit with a nose of a human body, the first limiting part of the rotating assembly can be rotated to a position which is counterbalanced by the first fitting part of the upper rim to limit and fix the upper rim;

when the rotating assembly in the nose pad assembly is rotated from the first position to a second position along the direction away from the cross beam, the first limiting part of the rotating assembly can be separated from the first fitting part of the upper rim to free the upper rim.

3. The composite glasses structure, according to claim 2, wherein a second limiting groove is arranged on the connecting piece in the rotating assembly as a second limiting part of the rotating assembly, and a second limiting block is arranged on the lower rim as a second fitting part of the lower rim;

further wherein, when the rotating assembly is rotated to the first position, the second limiting block is abutted and matched with the second fitting part to limit and fix the lower rim, and when the rotating assembly is rotated to a third position, the second limiting block is separated from the second fitting part to free the lower rim.

4. The composite glasses structure, according to claim 3, wherein the second limiting groove is a columnar groove, and the second limiting block is a columnar bump, and the columnar groove can be sleeved on the columnar bump.

5. The composite glasses structure, according to claim 4, wherein the connecting piece is provided with a first end and a second end, the first end can be inserted into a first mounting hole arranged on the inner side of the cross beam, and the second end is provided with two grooves, the rotating shaft can match with the two grooves and can turn relative to the two grooves, the two grooves are respectively positioned on two sides of the first limiting block on the rotating shaft.

* * * * *